J. T. HARRISON.
SELF HEATING SAD IRON.
APPLICATION FILED DEC. 9, 1911.

1,036,099.

Patented Aug. 20, 1912.

2 SHEETS—SHEET 1.

INVENTOR
J. Thos Harrison

J. T. HARRISON.
SELF HEATING SAD IRON.
APPLICATION FILED DEC. 9, 1911.
1,036,099.
Patented Aug. 20, 1912.
2 SHEETS—SHEET 2.
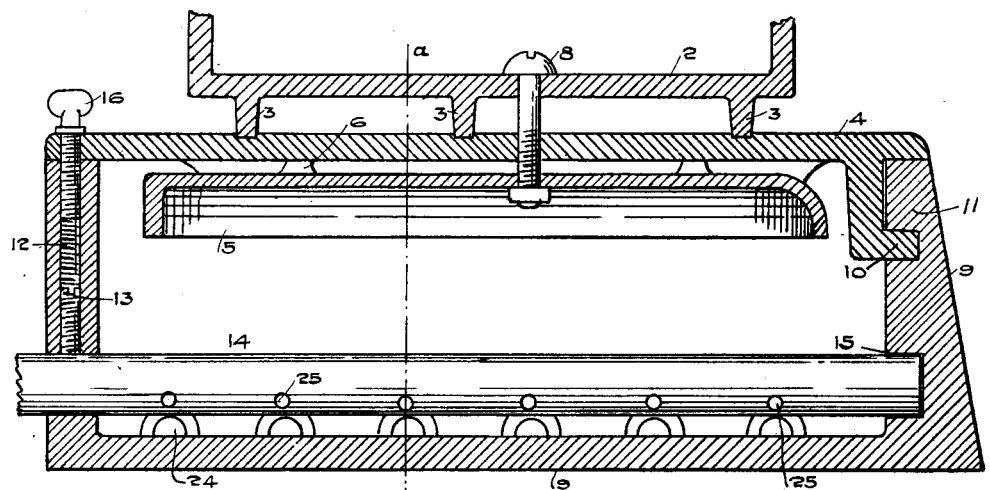
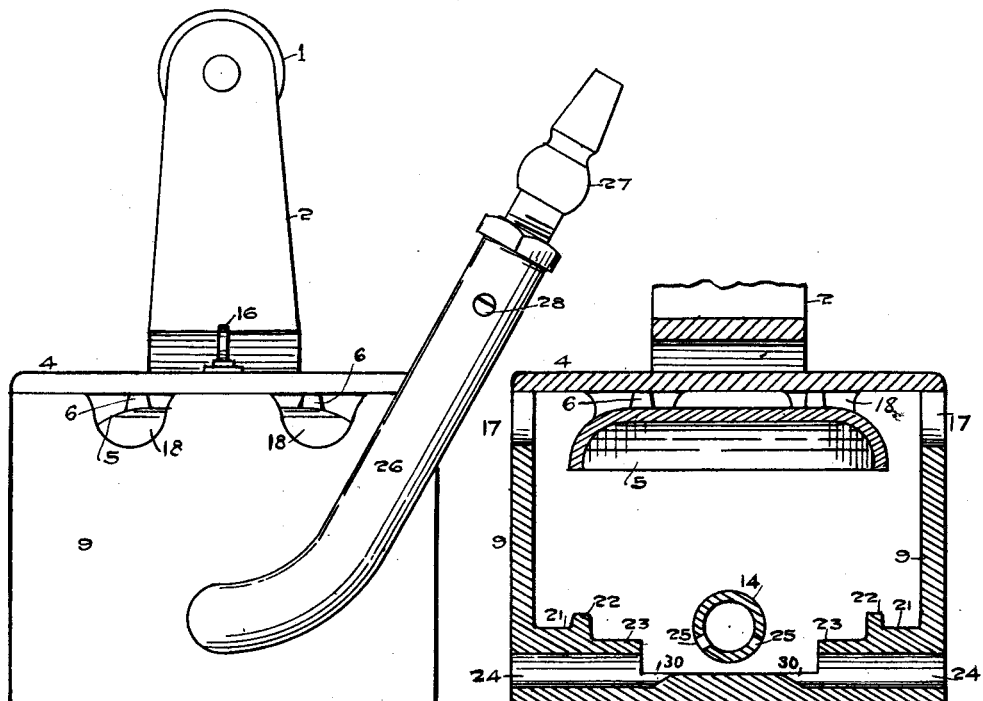

UNITED STATES PATENT OFFICE.

JOHN THOMAS HARRISON, OF PHILADELPHIA, PENNSYLVANIA.

SELF-HEATING SAD-IRON.

1,036,099. Specification of Letters Patent. Patented Aug. 20, 1912.

Application filed December 9, 1911. Serial No. 664,835.

*To all whom it may concern:*

Be it known that I, JOHN THOMAS HARRISON, a citizen of the United States, residing at Philadelphia, in the county of Philadelphia and State of Pennsylvania, have invented certain new and useful Improvements in Self-Heating Sad-Irons, of which the following is a specification.

My invention relates to self-heating sad irons.

The object is to simplify the construction of such irons and make them of few parts and avoid intricacies in the making and the handling, combined with increased efficiency, thereby extending their durability, scope and usefulness.

Figure 1:
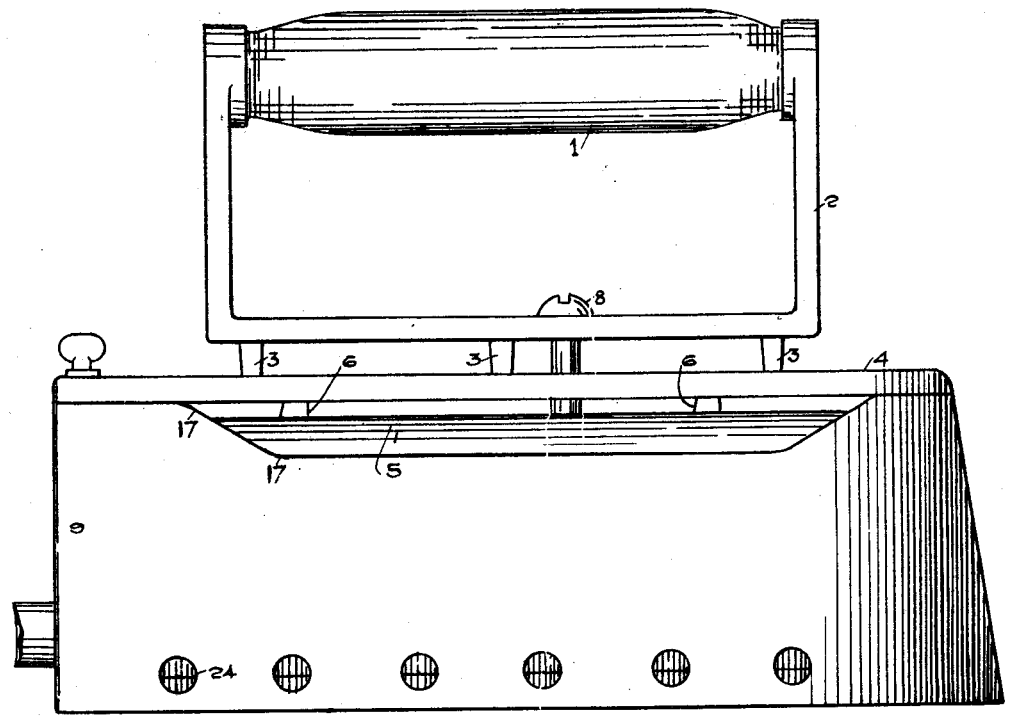
Figure 3:
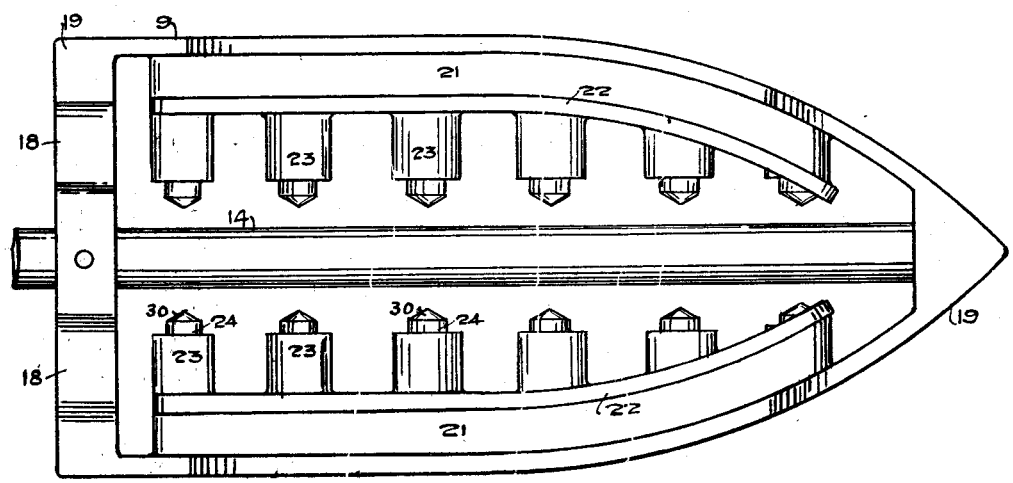

In the drawing, Figure 1 illustrates a full side view of my invention. Fig. 2 is a full rear end view of Fig. 1. Fig. 3 is a plan view of Fig. 1 with the cover removed. Fig. 4 is a full transverse section taken at "a, a," of Fig. 5. Fig. 5 is a longitudinal sectional elevation at the center of the sad iron.

Similar figures refer to similar parts in the different views.

In the drawing, 1 is the handle secured to handle carrier 2. The handle carrier has lugs 3 to fit in recesses on top of cover 4, 5 is a deflector which has lugs 6 to fit under the cover 4. A bolt 8 serves to fasten together the handle carrier 2, and the cover 4 and the deflector 5.

The cover 4 is secured to the body 9 of the sad iron by means of a lug 10 on the cover which enters the recess in the forward part 11 in the body 9. The body 9 has a tapped hole 12 in which a headless screw 13 is inserted and screwed down to hold in place the burner 14, which has its free end resting in the hole 15 in body 9. A thumb screw 16 screwed into tapped hole 12 serves to secure the rear end of the cover to the body 9. By means of thumb screw 16 and lug 10 the cover 4 is firmly secured to the body 9; which is the general condition for use in ironing. When it is desired to use the body 9 as a cooker, or for heating, the cover 4 is readily removed by unscrewing the thumb screw 16 and lifting the cover off.

The body 9 is cast so as to leave openings 17, 17, between it and the cover 4 on the sides and openings 18, 18, at the rear end which allow air to circulate over the deflector 5 and thus keep the handle bar cool and also serve as escape openings for the burnt gases. The openings 17, 17, of course are so arranged as to leave edges or parts 19 in the body 9 of suitable extent to carry any desired cooking utensils. The bottom 20 of body 9 is filled in and thick at the sides at 21, 21, so as to facilitate the casting. This filling-in 21 terminates with heat receiving and conducting ribs 22 from which extend, inwardly, lugs 23, which serve as arches over the air supply holes 24 drilled in the body 9. The air supply holes are drilled so as to pass through the lugs and also further so as to form grooves 30 in the bottom 20 and said grooves 30 terminate close to the gas outlets in the burner.

The burner 14 is supplied with gas exit holes 25 so arranged as to be in line transversely with the air inlet holes 24. The air inlet holes are drilled so that part of the holes or passages extend in toward the burner 14 and beyond the lugs or arches 23 so that the air and gas shall mix properly and produce a blue and intense heat flame against the inside of bottom 20, and arch 23 and ribs 22, thereby heating the bottom 20 very effectively without any waste or loss of gas. The burner 14 extends out and has an extension 26 provided with a nozzle 27 to which a flexible gas tube is attached.

Various changes may be made in detail, form and arrangement of parts without deviating from my invention.

Having thus described my invention, I claim:—

1. A sad iron having a hollow body, the bottom wall of said body having thickened portions adjacent the side walls, longitudinal heat conducting ribs extending above said thickened portions, lateral air inlet passages in said portions, arches extending inwardly from said thickened portions and forming continuations of said air passages, the inner ends of said air passages being upwardly inclined, a burner, having lateral outlets, longitudinally and centrally disposed in said body, means for securing said burner and means for supplying gas to said burner.

2. A sad iron having a hollow body, the bottom wall of said body having thickened portions adjacent to the side walls and a centrally disposed thinner portion between the same, longitudinal heat conducting ribs extending above the thickened portions, arches extending inwardly from said thickened portions, lateral air inlet passages passing through said thickened portions and through the arches, grooves in said thinner portion forming extensions of said air passages, the inner ends of said grooves being upwardly inclined, a burner, having lateral outlets, longitudinally and centrally disposed in said body, means for securing said burner, and means for supplying gas to said burner.

In testimony whereof I affix my signature in presence of two witnesses.

J. THOMAS HARRISON.

Witnesses:
　JAS. D. WINCHELL,
　RUSSELL C. SMITH.

Copies of this patent may be obtained for five cents each, by addressing the "Commissioner of Patents, Washington, D. C."